United States Patent
Jin et al.

(10) Patent No.: US 10,416,897 B2
(45) Date of Patent: Sep. 17, 2019

(54) MEMORY SYSTEM WITH LATENCY DISTRIBUTION OPTIMIZATION AND AN OPERATING METHOD THEREOF

(71) Applicant: SK hynix Inc., Gyeonggi-do (KR)

(72) Inventors: Young Tack Jin, Cupertino, CA (US); Sungjoon Ahn, Cupertino, CA (US); Seong Won Shin, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/839,244

(22) Filed: Dec. 12, 2017

(65) Prior Publication Data

US 2018/0275891 A1    Sep. 27, 2018

Related U.S. Application Data

(60) Provisional application No. 62/477,336, filed on Mar. 27, 2017.

(51) Int. Cl.
| | |
|---|---|
| *G06F 13/38* | (2006.01) |
| *G06F 3/06* | (2006.01) |
| *G06F 13/42* | (2006.01) |
| *G06F 13/16* | (2006.01) |
| *G06F 13/24* | (2006.01) |

(52) U.S. Cl.
CPC .......... *G06F 3/0611* (2013.01); *G06F 3/0647* (2013.01); *G06F 3/0685* (2013.01); *G06F 13/161* (2013.01); *G06F 13/1663* (2013.01); *G06F 13/24* (2013.01); *G06F 13/4282* (2013.01); *G06F 13/4295* (2013.01); *G06F 2213/0026* (2013.01)

(58) Field of Classification Search
None
See application file for complete search history.

(56) References Cited

U.S. PATENT DOCUMENTS

| | | |
|---|---|---|
| 8,832,330 B1 | 9/2014 | Lancaster |
| 9,058,183 B2 | 6/2015 | Woller et al. |
| 2011/0047553 A1 | 2/2011 | Lim et al. |
| 2016/0050111 A1 | 2/2016 | Jang et al. |
| 2017/0286333 A1* | 10/2017 | Jayakumar .............. G06F 13/24 |
| 2018/0046507 A1* | 2/2018 | Borlick ................. G06F 9/5044 |

FOREIGN PATENT DOCUMENTS

| | | |
|---|---|---|
| KR | 10-2011-0018618 | 2/2011 |
| KR | 10-2012-0111734 | 10/2012 |
| KR | 10-2016-0019824 | 2/2016 |

* cited by examiner

*Primary Examiner* — Scott C Sun
(74) *Attorney, Agent, or Firm* — IP & T Group LLP

(57) ABSTRACT

A memory system and an operating method thereof include: at least a CPU including multiple CPU cores, wherein the multiple CPU cores include reserved CPU cores and host CPU cores; at least a PCIe link coupled with the CPU, wherein the PCIe link includes at least a PCIe switch and a plurality of memory devices; and the plurality of memory devices coupled with the host CPU cores through respective workload threads and interrupt handlers, wherein the workload threads and interrupt handlers of each of the host CPU cores are configured to be optimized, the host CPU cores are isolated for the optimized workloads threads and interrupt handlers, and the workload threads and interrupt handlers are executed at the host CPU cores coupled thereto.

16 Claims, 5 Drawing Sheets

MEMORY SYSTEM WITH LATENCY DISTRIBUTION OPTIMIZATION AND AN OPERATING METHOD THEREOF

CROSS REFERENCE TO OTHER APPLICATIONS

This application claims priority to U.S. Provisional Patent Application No. 62/477,336 entitled ALL FLASH ARRAY LATENCY DISTRIBUTION OPTIMIZATION filed Mar. 27, 2017, which is incorporated herein by reference for all purposes.

BACKGROUND

Field of Invention

Exemplary embodiments of the present invention relate to an apparatus of semiconductor memory storage system, and more particularly to diagnose SSD and an operation method thereof.

Description of Related Arts

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, that is, a data storage device. The data storage device is used as a main memory device or an auxiliary memory device of the portable electronic devices. Thus, the reliability and security of digital data storage, such as a memory system, is critical.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD can include various flash memory components. The two main types of flash memory components are named after the NAND and NOR logic gates. The individual flash memory cells exhibit internal characteristics similar to those of the corresponding gates. The NAND-type flash memory may be written and read in blocks (or pages) which are generally much smaller than the entire device. The NAND-type operates primarily in memory cards, USB flash drives, solid-state drives, and similar products, for general storage and transfer of data.

Optimized SSD read I/O latency distribution is always a very important component of the all flash array. Optimized SSD read I/O latency distribution is particularly crucial and needs to be accomplished for Linux kernel in Non-Volatile Memory Express (NVMe) SSD device drivers.

Thus, there remains a need for a semiconductor memory system and operating method thereof having latency optimization mechanism. In view of the ever-increasing need to improve performance, it is more and more critical that answers be found to these problems. Solutions to these problems have been long sought but prior developments have not taught or suggested any solutions and, thus, solutions to these problems have long eluded those skilled in the art.

SUMMARY

Embodiments of the present disclosure are directed to a semiconductor memory system and an operating method thereof capable of improving the performance and reliability of a memory system.

In accordance with an embodiment of the present disclosure, there is provided with an apparatus of a memory system which includes: at least a CPU including multiple CPU cores, wherein the multiple CPU cores include reserved CPU cores and host CPU cores; at least a PCIe link coupled with the CPU, wherein the PCIe link includes at least a PCIe switch and a plurality of memory devices; and the plurality of memory devices coupled with the host CPU cores through respective workload threads and interrupt handlers, wherein the workload threads and interrupt handlers of each of the host CPU cores are configured to be optimized, the host CPU cores are isolated for the optimized workloads threads and interrupt handlers, and the workload threads and interrupt handlers are executed at the host CPU cores coupled thereto.

In accordance with an embodiment of the present disclosure, there is provided with a method of operating a semiconductor memory system which includes: providing at least a CPU including multiple CPU cores, wherein the multiple CPU cores include reserved CPU cores and host CPU cores; coupling at least a PCIe link with the CPU, wherein the PCIe link includes at least a PCIe switch and a plurality of memory devices; coupling the plurality of memory devices with the host CPU cores through respective workload threads and interrupt handlers; optimizing the workload threads and interrupt handlers of each of the host CPU cores; isolating the host CPU cores for the optimized workloads threads and interrupt handlers; and executing the workload threads and interrupt handlers at the host CPU cores coupled thereto.

DETAILED DESCRIPTION

Figure 1:
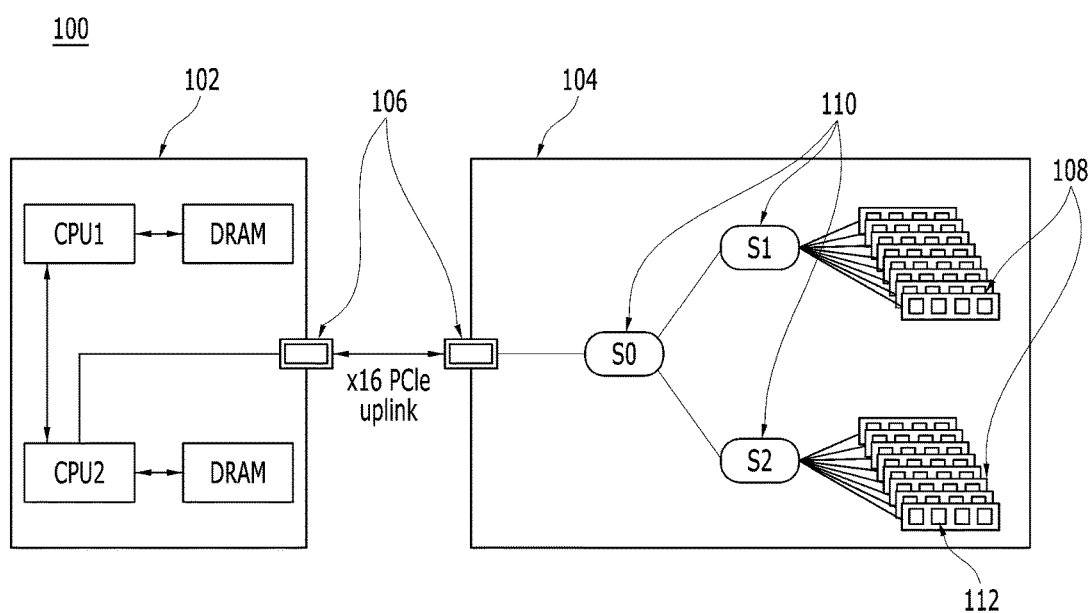
FIG. 1 is a top level block diagram schematically illustrating a prototype of a memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In current technologies, for a memory system with multiple SSDs, such as tens to hundreds of SSDs, the Linux kernel may have a problem of non-optimized read I/O latency distributions. Typically, the non-optimized read I/O latency distributions, such as higher average latencies and more diverged latency distributions, due to complexity of operating system and host hardware architecture, may be shown with default Linux kernel configurations. The non-optimized read I/O latency distributions may be caused by following reasons:

1. Workload/application process priority: the Linux kernel default configuration may set Linux kernel default priority suboptimal, such that the workload/application process priority may not be optimized, and may prevent the read I/O latencies to be optimized accordingly and the latency distributions to be converged.

2. CPU isolation/pinning: the Linux kernel may not run workload/application, or SSD driver threads in isolation, such that system tasks and SSD internal tasks may be run mixed but not isolated.

3. CPU affinity: the Linux kernel may not always execute NVMe SSD device driver's interrupt (IRQ) handlers on allocated CPU cores thereof, such that the Linux kernel may execute the IRQ handlers on CPU cores not allocated thereof.

As a first step to achieve better read I/O latency characteristics in the all flash array system, new features are added to the Linux kernel to better support the multiple NVMe SSDs. The NVMe SSD based all flash array systems can benefit various applications, such as high performance computing and real-time large data analysis, because of fast performance of the all flash array systems. One of the desired performance metrics may be predictable low latency of the flash storage system configured by the Linux Operating System (OS). The NVMe SSDs hosted in the memory system, such as the all flash array system, can be connected to a single host server, such as Intel Xeon server processors.

The Linux kernel traces can be analyzed to identify potential issues with the Linux default configurations, and process priority, CPU isolation, and CPU affinity of NVMe IRQ handlers can be better configured to overcome the shortcomings of the Linux default configurations. Linux kernel configuration parameters can be fine-tuned to optimize the storage latency characteristics of all the SSDs inside the all flash array system. The optimized result shows that the standard deviation of maximum latency can be reduced by a factor of ×400.

The average read latency and read latency distribution up to 6-nine (99.9999%) percentiles can be used as main performance metrics. Up to 9-nine percentiles read latencies can often be required by enterprise SSD deployments in hyper-scale data centers. Also, in order to minimize latency variations due to the SSD internal tasks, such as garbage collections, the latencies can be measured in FOB (Fresh Out-of-the Box) state of the SSDs and achieved through NVMe SSD format command.

In addition to put each of the NVMe SSDs to FOB state and minimize the system's overhead on read latencies, Future I/O (FIO) workload threads, such as workload/application threads, can be evenly distributed into the set of CPU cores. The FIO workload generation of thread for each of the NVMe SSDs can run on a dedicated physical CPU core via FIO's CPUs' allowed options.

The embodiments of the present invention propose a scheme to optimize the read I/O latency distribution in a memory system, such as multiple SSDs hosted in an all flash array system. An optimization apparatus and method presented in the scheme can modify behavior of the Linux kernel in NVMe SSD device's drivers, such as workload process priority, CPU isolation/pinning, CPU affinity of interrupt handlers, or a combination thereof. The modified behavior of the Linux kernel can improve average and read latencies.

The apparatus and method can modify the default Linux kernel behaviors to optimally execute multiple process threads, and significantly improve the read latency distributions of tens and hundreds of SSDs, such as minimizing the average and latency variations. The behavior of the Linux kernel can be modified with various aspects, includes:

1. Workload/application process priority: the apparatus and method proposed in the embodiments of the present invention can optimize the workload/application process priority, such that the highest priority can be assigned to the workload/application threads.

2. CPU isolation/pinning: the apparatus and method proposed in the embodiments of the present invention can execute the workload/application threads and corresponding IRQ handlers in isolation for the SSD internal tasks only, to significantly improve the SSD read I/O latencies.

3. CPU affinity: the apparatus and method proposed in the embodiments of the present invention can force the threads or SSD device driver's IRQ handlers to run only on the allocated CPU cores thereof.

Referring now to FIG. 1, herein is shown a top level block diagram schematically illustrating a prototype of flash array in accordance with an embodiment of the present invention. A memory system 100 can comprise a server 102 and a flash array 104, wherein the flash array 104 can be coupled with the server 102 through PCIe extender cards 106, such as ×16 PCIe uplink. The flash array 104 can include one of the PCIe extender cards 106 coupled with SSD cards 108 through PCIe switches 110. A PCIe extender-PCIe extender can be used to connected the PCIe extender cards 106 as shown in FIG. 1.

The server 102 can include at least one CPU, wherein the at least one CPU can be coupled with the flash array 104 through the PCIe extender cards 106, and the at least one CPU can be connected with one of the PCIe extender cards 106 by a CPU-PCIe extender. The flash array 104 can include rows of the SSD cards 108, wherein each of the SSD cards 108 can carry multiple SSDs 112. The SSD cards 108 can be divided into multiple groups, and the SSD cards 108 in each group can share one of the PCIe switches 110 at a lower hierarchical level. The PCIe switches 110 at the lower hierarchical level can be connected with each other and further coupled with one of the PCIe extender cards 106, through one of the PCIe switches 110 at a higher hierarchical level.

For example, as shown in FIG. 1, the server 102 can have 2 CPUs including CPU1 and CPU2. One of the CPUs, such as CPU2, can be connected with one of the PCIe extender card 106. The flash array 104 can include the multiple SSD cards 108 divided into multiple groups, such as 16 SSD cards divided into 2 groups. Each of the SSD cards 108 can carry multiple SSDs 112, such as 4 SSD 112 carried in each of the SSD cards 108. Each group of the SSD cards 108 can be connected through one of the PCIe switches 110 at the lower hierarchical level, such as S1 and S2, and further coupled to the PCIe extender card 106 via one of the PCIe switches 110 at the higher hierarchical level, such as S0. The PCIe extender cards 106 can be connected with each other. The PCIe switches 110 can be arranged in multiple hierarchical levels, such as 2 hierarchical levels shown in FIG. 1.

Figure 2:
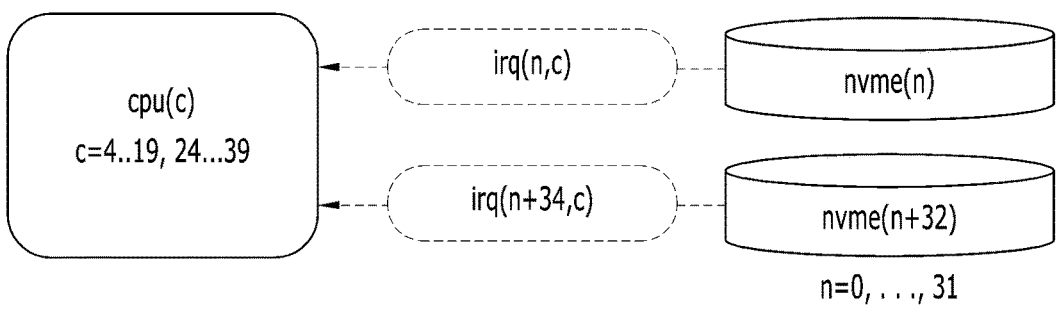
FIG. 2 is a diagram illustrating CPU geometry and threads of a memory system in accordance with an embodiment of the present invention.

Referring now to FIG. 2, herein is shown a diagram illustrating CPU geometry and threads of memory system in accordance with an embodiment of the present invention. A server can comprise multiple CPUs and NVMe SSDs, such as 2 CPUs and 64 NVMe SSDs. The CPU1 and CPU2 of FIG. 1 can comprise multiple CPU cores individually. For example, 20 CPU cores can be included in each of the CPU1 and CPU2 as shown in FIG. 2, wherein each of the CPU cores can be indexed as cpu(c), and c is an integer of 0 to 39. Two workload/application threads and corresponding IRQ handlers can map and coordinate all 64 NVMe SSDs to the CPU cores, respectively.

A portion of the total of 40 CPU cores can be reserved for the system tasks, for example, cpu(0-3) and cpu(20-23) of CPU1 are reserved for the system tasks and may not be used for the SSD internal tasks. The rest of the CPU cores, such as cpu(4-9) and cpu(24-29) of the CPU1 and cpu(10-19) and cpu(30-39) of the CPU2 can be utilized as host CPU cores for the SSD internal tasks, such that the workload/application threads and interrupt handlers of the NVMe(n), wherein n is an integer of 0 to 63, can be allocated to the host CPU cores as shown in a table 202 of FIG. 2.

As shown in the table 202, cpu(4-19) can be assigned to multiple SSDs, such as NVMe(0-15) and (32-47), and cpu(24-39) can be assigned to multiple SSDs, such as NVMe(16-31) and (48-63), through the handlers IRQ(n,c), wherein the IRQ(n,c) denotes IRQ handler for I/O queue of NVMe(n) running on logical CPU core cpu(c). Only IRQ handlers with the proper mapping can be configured to run actively, while all other IRQ handlers may remain inactive. For instance, for the NVMe(0) allocated to cpu(4), IRQ(0,4) may be configured active, while other 39 IRQ(0,x) are all configured inactively, wherein x is 0, 1, 2, 3, 5, 6, . . . , 39.

The scheme to improve the latency distributions can include the following steps.

1. Evenly distributing workload/application threads and SSD IRQ handlers to the host CPU cores, such as cpu(4-19) and cpu(24-39) as shown in FIG. 2.

First, the number of the host CPU cores need to be determined. The number of the host CPU cores can be the total number of the CPU cores of the server subtracting the number of CPU cores reserved for the system tasks. In the example shown in FIG. 2, the number of the host CPU cores is 40−8=32, wherein the total number of CPU cores of CPU1 and CPU2 is 40 and the number of CPU cores reserved for the system tasks is 8.

Then, the number of workload/application threads assigned to each of the host CPU cores can be determined. The number of workload/application threads per host CPU core can be calculated as the total number of the SSDs divided by the total number of the host CPU cores. In the example shown in FIG. 2, the number of workload/application threads per host CPU core is 64/32=2, wherein the total number of the SSDs is 64 and the total number of the host CPU cores is 32.

The workload/application threads and SSD interrupt handlers can be allocated to the host CPU cores. Starting from the lowest SSD ID and lowest host CPU core ID, such that the NVMe (0) is allocated to cpu(4), until the NVMe (31) is allocated to cpu(39). After each of the host CPU cores is allocated with at least one of the SSDs, the allocation can be looped back to the first host CPU core ID, if more SSDs are needed to be allocated. As shown in FIG. 2, the allocation can be looped back to cpu(4), such that the NVMe (32) is allocated to cpu(4), until the NVMe (63) is allocated to cpu(39). Thus, each of the host CPU cores cpu(c) can have two SSDs allocated thereto. The allocation process can be repeated until all of the SSDs are allocated to the host CPU cores, and the number of the SSDs allocated to each of the host CPU cores can be the same or close, for an evenly distributed workload/application threads.

Once all of the SSDs are assigned to the host CPU cores as shown in the table 202, the optimization process can begin with the following steps.

2. Prioritizing the workload/application. For example, the workload/application priority can be initialized to the highest system value, such as 99. The initialization with the highest system value can be achieved with various methods, such as using "chrt" command in the Linux.

3. The CPU isolation/pinning can be set after the workload/application priority is set. The number of the CPU cores reserved for the system tasks can be indicated by the CPU core ID. For example, 8 CPU cores are reserved as shown in FIG. 2, and the rest of 32 host CPU cores of ID cpu(4 . . . 19) and cpu(24 . . . 39) can be isolated/reserved for the workload/application threads and NVMe IRQ handers only. The host CPU cores isolation can be achieved with various methods, such as being configured as a kernel boot option. The kernel boot option can specify the most infrequent timer interrupts for isolated the CPU cores, and keep the host CPU cores from getting into idle state. CPU isolation/pinning may be based on physical cores rather than logical cores. In the Linux, the CPU isolation/pining can be achieved with various methods, such as using operating system boot option "isolcpu" command.

4. Set CPU affinity: Ensure the mapping of the SSD threads to CPU cores established in step 1, such that the allocation of the workload/application threads and corresponding SSD interrupt handlers to each of the host CPU cores can be enforced. Some of the IRQ handlers maybe executed on the CPU cores other than designated CPU cores thereof shown in the Table 202. As an example, NVMe(0) maybe executed on a logical CPU core other than the designated cpu(4). Therefore, additional configuration needs to be set to force the IRQ handlers of each NVMe SSD to execute only on the designated CPU core. For example, the CPU affinities of 2,560 IRQ handlers created for 64 NVMe SSDs can be properly set immediately after the system boot. The IRQ handlers' CPU affinities can be manipulated through Linux kernel commands, such as "procfs" and "tuna" commands.

Figure 3:
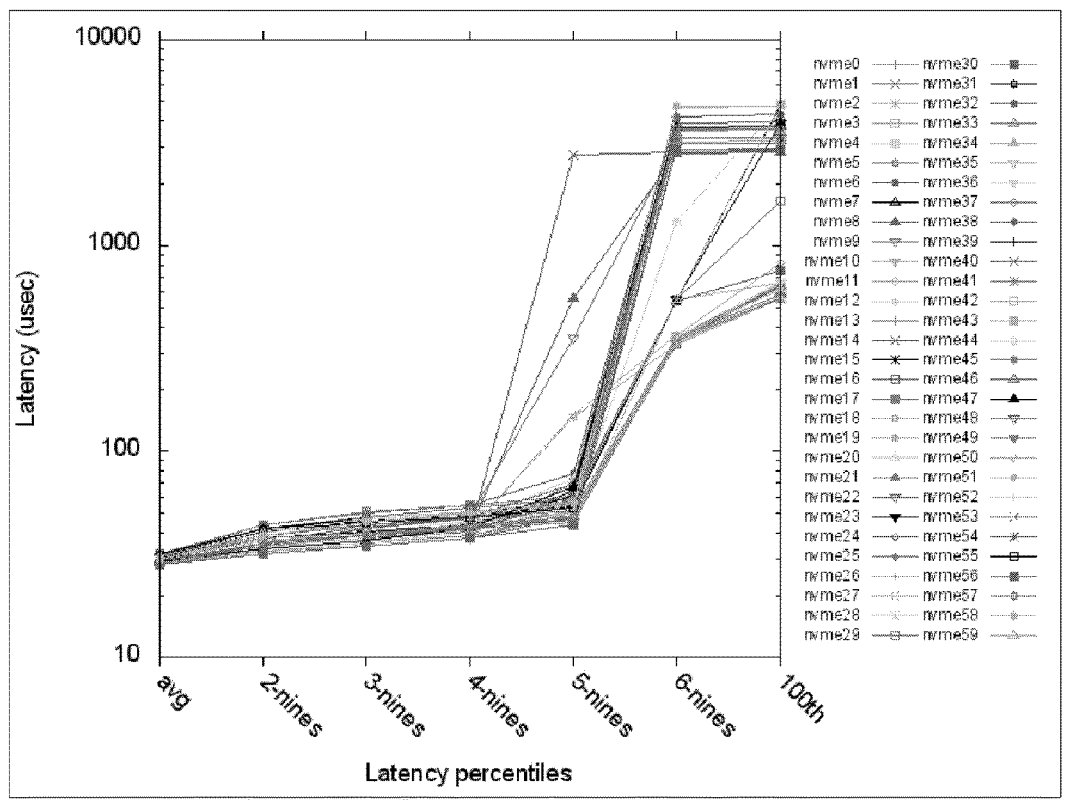
FIG. 3 is a diagram illustrating latency distribution before improvements of a memory system in accordance with an embodiment of the present invention.

Referring now to FIG. 3, herein is shown a diagram illustrating latency distribution before improvements of a memory system in accordance with an embodiment of the present invention. The plots depict the latency distribution of the 60 NVMe SSDs obtained under the default Linux configurations, before any optimization is performed.

As shown in FIG. 3, X coordinate axis is percentile of latency tail values falling into the specific bucket. For example, 6-nines percentile indicates example latency value out of measured latency samples falling into 99.9999% bucket. Y coordinate axis is latency values measured in microsecond (usec). Each plot is one of the measured latency value of the 60 NVMe SSDs, such as NVMe0, NVMe1, . . . NVMe59. The distribution shows relatively wide spread latencies from 5-nines percentile, and the worst case latency value is at approximately 4,900 usec.

Figure 4:
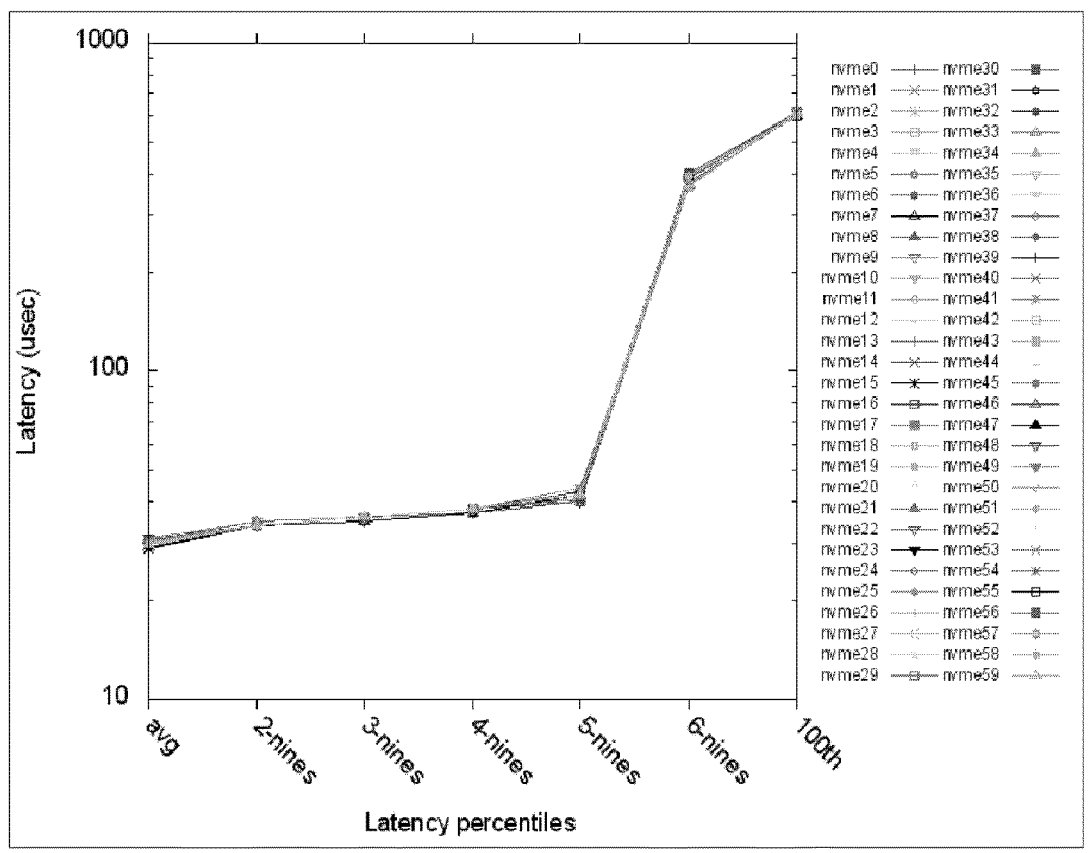
FIG. 4 is a diagram illustrating latency distribution after improvements of a memory system in accordance with an embodiment of the present invention.

Referring now to FIG. 4, herein is shown a diagram illustrating latency distribution after improvements of a memory system in accordance with an embodiment of the present invention. All the steps in FIG. 2 can be implemented for improving the latency distributions. Each step may contribute a certain degree of the latency distribution improvement, when all the steps are executed, the latency distribution across multiple NVMe SSDs can become more converged in FIG. 4 than in FIG. 3.

Sampling data shows that optimization of workload/application priority may yield the most impact to the average latency in certain situations, while the CPU affinity modification may drastically reduce the average latency and 2 to 5 nines percentile latency distributions. The worst case latencies may be improved significantly with all the system optimizations.

As shown in FIG. 4, X coordinate axis is percentile of latency tail values falling into the specific bucket. For example, 6-nines percentile indicate example latency value out of measured latency samples falling into 99.9999% bucket. Y coordinate axis is latency values measured in microsecond. Each plot is one of the measured values of the 60 NVMe SSDs, such as NVMe0, NVMe1, . . . NVMe59. The distribution shows relatively consistent latencies at all latency percentiles, and the worst case latency value is at approximately 600 usec.

The system including a host server and a plurality of SSDs and operating method thereof for optimizing SSD latency distributions may comprise, evenly distributing the workload/application threads and interrupt handler threads to the host CPU cores, setting highest possible process priority to the workload/application threads, ensuring the SSD threads executed in isolation through the CPU isolation/pinning, and ensuring CPU affinity maintained for the SSD threads. The optimization process can be performed repeatedly, until the desired results are reached.

Comparison of different number of SSD threads per CPU core shows that, the average latency may become lower for fewer SSD threads per CPU core, but the standard deviations may be all similar, such that the latency distributions are quite similar. The results also confirm the validity of running latency profile workload over multitudes of SSDs as long as CPU core utilization is kept at sufficiently low level.

Figure 5:
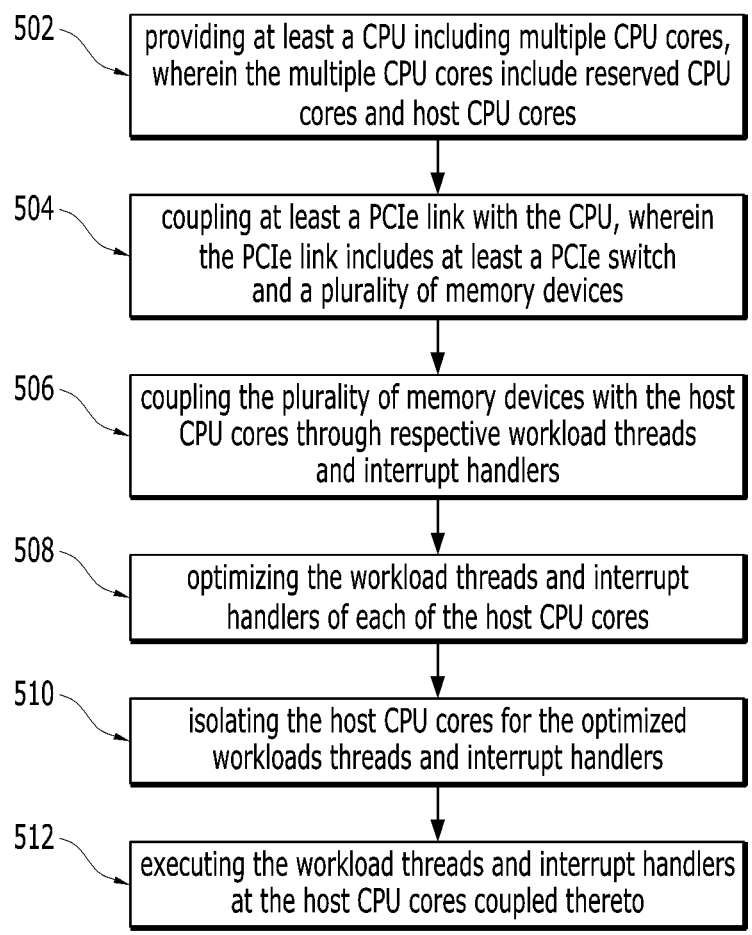
FIG. 5 is a flowchart illustrating an operating method of a memory system in accordance with an embodiment of the present invention.

Referring now to FIG. 5, herein is shown a flowchart illustrating an operating method of a memory system in accordance with a further embodiment of the present invention. An operating method of a memory system comprising: providing at least a CPU including multiple CPU cores, wherein the multiple CPU cores include reserved CPU cores and host CPU cores in a block of 502; coupling at least a PCIe link with the CPU, wherein the PCIe link includes at least a PCIe switch and a plurality of memory devices in a block of 504; coupling the plurality of memory devices with the host CPU cores through respective workload threads and interrupt handlers in a block of 506; optimizing the workload threads and interrupt handlers of each of the host CPU cores in a block of 508; isolating the host CPU cores for the optimized workloads threads and interrupt handlers in a block of 510; and executing the workload threads and interrupt handlers at the host CPU cores coupled thereto in a block of 512.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hitherto fore set forth herein or shown in the accompanying drawings are to be interpreted in an illustrative and non-limiting sense.

What is claimed is:

1. A memory system comprising:
    a central processing unit (CPU) including multiple CPU cores, wherein the multiple CPU cores include reserved CPU cores and host CPU cores;
    a PCIe link coupled with the CPU, wherein the PCIe link includes a PCIe switch and a plurality of memory devices; wherein
    the plurality of memory devices are coupled to the host CPU cores through respective sets of workload threads and interrupt handlers, the workload threads and interrupt handlers are distributed among the host CPU cores, the workload threads have priority of execution with respect to the interrupt handlers, the host CPU cores are isolated for isolated execution of the workload threads and interrupt handlers, and the workload threads and interrupt handlers in each set are executed at the corresponding host CPU core.

2. The memory system recited in claim 1 wherein the workload threads and interrupt handlers are evenly distributed among the host CPU cores.

3. The memory system recited in claim 2 wherein the evenly distributed workload threads and interrupt handlers are a total number of the plurality of memory devices divided by a total number of the host CPU cores.

4. The memory system recited in claim 3 wherein the total number of the host CPU cores is a total number of the multiple CPU cores subtracted by a total number of the reserved CPU cores.

5. The memory system recited in claim 1 wherein the optimized workload threads and interrupt handlers includes a prioritized workload/application with an initial value of the highest system value.

6. The memory system recited in claim 1 wherein the host CPU cores are isolated from idle state.

7. The memory system recited in claim 1 wherein the plurality of memory devices coupled to the host CPU cores includes the plurality of memory devices allocated to the host CPU cores, respectively.

8. The memory system recited in claim 7 wherein the workload threads and interrupt handlers are distributed among the CPU cores by assigning the workload threads and interrupt handlers to the CPU cores in an order based on identification numbers of the CPU cores.

9. An operating method of a memory system comprising:
providing a central processing unit (CPU) including multiple CPU cores, wherein the multiple CPU cores include reserved CPU cores and host CPU cores;
coupling a PCIe link with the CPU, wherein the PCIe link includes a PCIe switch and a plurality of memory devices;
coupling the plurality of memory devices with the host CPU cores through respective sets of workload threads and interrupt handlers;
distributing the workload threads and interrupt handlers among the host CPU cores;
assigning a higher priority of execution to the workload threads with respect to the interrupt handlers;
isolating the host CPU cores for isolated execution of the workloads threads and interrupt handlers; and
executing each set of the workload threads and interrupt handlers at the corresponding host CPU core.

10. The method recited in claim 9 wherein the workload threads and interrupt handlers are evenly distributed among the host CPU cores.

11. The method recited in claim 10 wherein the evenly distributed workload threads and interrupt handlers are a total number of the plurality of memory devices divided by a total number of the host CPU cores.

12. The method recited in claim 11 wherein the total number of the host CPU cores is a total number of the multiple CPU cores subtracted by a total number of the reserved CPU cores.

13. The method recited in claim 9 wherein the optimized workload threads and interrupt handlers includes a prioritized workload/application with an initial value of the highest system value.

14. The method recited in claim 9 wherein the host CPU cores are isolated from idle state.

15. The method recited in claim 9 wherein the plurality of memory devices coupled with the host CPU cores includes the plurality of memory devices allocated the host CPU cores, respectively.

16. The method recited in claim 15 wherein the distributing comprises assigning the workload threads and interrupt handlers to the CPU cores in an order based on identification numbers of the CPU cores.

* * * * *